United States Patent
Nakagawa

(10) Patent No.: US 11,065,836 B2
(45) Date of Patent: Jul. 20, 2021

(54) GLASS PLATE MODULE

(71) Applicant: NIPPON SHEET GLASS COMPANY, LIMITED, Tokyo (JP)

(72) Inventor: Masafumi Nakagawa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 365 days.

(21) Appl. No.: 15/743,567

(22) PCT Filed: Jul. 29, 2016

(86) PCT No.: PCT/JP2016/072427
§ 371 (c)(1),
(2) Date: Mar. 12, 2018

(87) PCT Pub. No.: WO2017/018535
PCT Pub. Date: Feb. 2, 2017

(65) Prior Publication Data
US 2018/0200983 A1 Jul. 19, 2018

(30) Foreign Application Priority Data
Jul. 30, 2015 (JP) .............................. JP2015-151368

(51) Int. Cl.
*B32B 3/24* (2006.01)
*B32B 3/26* (2006.01)
(Continued)

(52) U.S. Cl.
CPC ................ *B32B 3/266* (2013.01); *B32B 7/12* (2013.01); *B32B 17/10036* (2013.01);
(Continued)

(58) Field of Classification Search
CPC ...................................................... B32B 3/266
See application file for complete search history.

(56) References Cited

U.S. PATENT DOCUMENTS
2006/0080688 A1 4/2006 Soeda et al.

FOREIGN PATENT DOCUMENTS
JP 61-105246 A 5/1986
JP 62-105715 A 5/1987
(Continued)

OTHER PUBLICATIONS
International Search Report (PCT/ISA/210) issued in PCT/JP2016/072427, dated Nov. 1, 2016.
(Continued)

*Primary Examiner* — William P Watkins, III
(74) *Attorney, Agent, or Firm* — Birch, Stewart, Kolasch & Birch, LLP

(57) ABSTRACT

The present invention provides a glass plate module to be attached to a vehicle. The glass plate module includes laminated glass in which an outer glass plate, an interlayer, and an inner glass plate are layered in this order; a mask layer that is provided on the laminated glass and blocks a field of vision from outside; and an attachment member that is attached to a portion corresponding to the mask layer on the inner glass plate with at least a first adhesion means and a second adhesion means and configured to support an information acquisition device for acquiring information from outside of a vehicle. The first adhesion means includes adhesive at at least one location. The second adhesion means is configured such that the adhesive conducts preliminary fixing prior to curing. The attachment member includes a fixation portion that faces the mask layer and has a bonding surface provided with the adhesion means. The fixation portion includes at least one adhesive confirmation portion through which the adhesive applied to the bonding surface can be seen from the vehicle interior side.

10 Claims, 13 Drawing Sheets

(51) Int. Cl.
*B60J 1/00* (2006.01)
*B60R 11/04* (2006.01)
*B60R 11/02* (2006.01)
*B32B 17/10* (2006.01)
*B32B 7/12* (2006.01)

(52) U.S. Cl.
CPC .. *B32B 17/10064* (2013.01); *B32B 17/10348* (2013.01); *B32B 17/10357* (2013.01); *B60J 1/00* (2013.01); *B60R 11/02* (2013.01); *B60R 11/04* (2013.01); *B32B 2250/03* (2013.01); *B32B 2250/05* (2013.01); *B32B 2250/40* (2013.01); *B32B 2307/402* (2013.01); *B32B 2605/006* (2013.01)

(56) References Cited

FOREIGN PATENT DOCUMENTS

| JP | 62-135584 A | 6/1987 |
|---|---|---|
| JP | 2-200517 A | 8/1990 |
| JP | 60-62491 U | 8/1990 |
| JP | 5-141455 A | 6/1993 |
| JP | 3080829 U | 10/2001 |
| JP | 2004-196184 A | 7/2004 |
| JP | 2005-146035 A | 6/2005 |
| JP | 2006-134556 A | 5/2006 |
| JP | 2006-216817 A | 8/2006 |
| JP | 2006-327381 A | 12/2006 |
| JP | 2008-263537 A | 10/2008 |
| JP | 2010-15743 A | 1/2010 |
| JP | 2011-49189 A | 3/2011 |

OTHER PUBLICATIONS

Written Opinion (PCT/ISA/237) issued in PCT/JP2016/072427, dated Nov. 1, 2016.
Japanese Office Action for Japanese Application No. 2015-151368, dated Oct. 8, 2019, with an English translation.
Extended European Search Report for European Application No. 16830638.9, dated Feb. 28, 2019.
Japanese Notification of Reasons for Rejection for Japanese Application No. 2015-151368, dated Feb. 26, 2019, with English translation.
Chinese Office Action and Search Report, dated Nov. 19, 2019 for Chinese Application No. 201680044305.X, with English translations.
Chinese Office Action, dated Sep. 24, 2020, for Chinese Application No. 201680044305.X, with an English translation.

GLASS PLATE MODULE

TECHNICAL FIELD

The present invention relates to a glass plate module.

BACKGROUND ART

In recent years, safety performance of automobiles has dramatically improved. In order to avoid a collision with a preceding vehicle, for example, a safety system is proposed in which the distance to the preceding vehicle and the speed of the preceding vehicle are detected and a brake automatically engages in an abnormal approach to the preceding vehicle. In such a system, the distance to the preceding vehicle and the like are measured using a laser radar or a camera. In general, an information acquisition device such as a laser radar or a camera is arranged on the inner side of a windshield, and the measurements are performed by emitting infrared rays frontward.

In order to conceal such an information acquisition device from the outside, a mask layer is formed on the inner surface of a glass plate by applying dark-colored ceramic, and the information acquisition device is arranged on the mask layer. In general, such a mask layer is formed at the peripheral edge of the glass plate and near the center of the upper portion of the glass plate. At this time, an opening is formed in the mask layer, and a laser beam emitted and received by the laser radar, infrared rays received by the camera, and the like are emitted and received through this opening. In general, such an information acquisition device is not directly fixed to the mask layer, but is fixed to the mask layer via an attachment member such as a bracket. Specifically, after the attachment member is fixed to the mask layer with adhesive or double-sided adhesive tape, the information acquisition device is attached to this attachment member. Then, a cover is attached to the attachment member from a vehicle interior side, and thus the information acquisition device is arranged in a space closed by the glass plate, the attachment member, and the cover.

CITATION LIST

Patent Literature

Patent Literature 1: JP 2006-327381A

SUMMARY OF INVENTION

Technical Problem

Both the double-sided adhesive tape and the adhesive are essential for the attachment of such an attachment member because the double-sided adhesive tape functions to temporarily attach the attachment member until the adhesive solidifies, and the adhesive functions to permanently fix the attachment member. However, the attachment member is fixed by the double-sided adhesive tape even when the adhesive is not applied, and therefore, in some cases, it is not obvious at first glance that the adhesive is not applied. In particular, the attachment member is fixed to the mask layer, and thus the adhesive and the double-sided adhesive tape are blocked by the mask layer and cannot be seen from the vehicle exterior side. Accordingly, it cannot be confirmed whether or not the adhesive is present after the attachment member is fixed to the mask layer. If the adhesive is not applied, the adhesiveness is provided by only the double-sided adhesive tape and is thus low, and thus there is a risk that the attachment member will come off the mask layer.

The present invention was achieved in order to solve the foregoing problems, and it is an object thereof to provide a glass plate module with which it can be confirmed whether or not the adhesive is present even after the attachment member is fixed to the mask layer.

Solution to Problem

A glass plate module according to the present invention to be attached to a vehicle includes: laminated glass in which an outer glass plate, an interlayer, and an inner glass plate are layered in this order; a mask layer that is provided on the laminated glass and blocks a field of vision from outside; and an attachment member that is attached to a portion corresponding to the mask layer on the inner glass plate with at least a first adhesion means and a second adhesion means and configured to support an information acquisition device for acquiring information from outside of a vehicle, wherein the first adhesion means includes adhesive at at least one location, the second adhesion means is configured such that the adhesive conducts preliminary fixing prior to curing, the attachment member includes a fixation portion that faces the mask layer and has a bonding surface provided with both of the adhesion means, and the fixation portion includes at least one adhesive confirmation portion through which the adhesive applied to the bonding surface can be seen from a vehicle interior side.

The above-mentioned glass plate module may have a configuration in which the second adhesion means includes at least one piece of double-sided adhesive tape having a thickness of 0.2 mm or more and 0.8 mm or less.

The above-mentioned glass plate module may have a configuration in which the adhesive confirmation portion is constituted by a through hole formed in the fixation portion, and at least a portion of a region to which the adhesive is applied and a spread-out region of the adhesive intersects the through hole on the bonding surface.

In this configuration, the adhesive can be applied in a linear manner to intersect the through hole, and the through hole can be formed to have an external shape in which a length in a first direction in which the adhesive extends is smaller than a length in a second direction that intersects the first direction at a right angle. It should be noted that the "spread-out region" refers to a region on the bonding surface in which the adhesive applied to the bonding surface is present when the adhesive is sandwiched between the fixation portion and the mask layer and spread out, and the spread-out region also encompasses a portion protruding from the bonding surface.

The above-mentioned glass plate module may have a configuration in which the adhesive confirmation portion is constituted by a cutout formed at an edge of the fixation portion, and at least a portion of a region to which the adhesive is applied or a spread-out region of the adhesive overlaps with the cutout on the bonding surface.

In this configuration, the adhesive can be applied in a linear manner so as to pass near a position that is farthest from an outer edge of the fixation portion.

There is no particular limitation on the shape of the cutout, but the cutout can be formed in an ark shape, for example.

The above-mentioned glass plate module may have a configuration in which when applied to the bonding surface, the adhesive is constituted by a main portion and an extended portion that extends from the main portion to an edge of the fixation portion or a vicinity of an edge of the fixation portion, and the adhesive confirmation portion is constituted by a portion at an edge of the fixation portion, which is reached by the extended portion.

In this configuration, the main portion can be formed to extend in one direction, and a length in the extended portion in a direction in which the main portion extends can be set to be smaller than a length of the main portion.

The above-mentioned glass plate module may have a configuration in which the mask layer is made of a dark-colored ceramic layer.

A method for manufacturing a window module that is configured to be attached to a vehicle and that is provided with an information acquisition device for acquiring information from outside of the vehicle according to the present invention includes: a step of preparing a glass plate module including:

laminated glass in which an outer glass plate, an interlayer, and an inner glass plate are layered in this order;
a mask layer that is provided on the laminated glass and blocks a field of vision from outside; and
an attachment member that is attached to a portion corresponding to the mask layer on the inner glass plate with at least a first adhesion means and a second adhesion means and supports the information acquisition device, and
a step of installing the information acquisition device on the inner glass plate side via the attachment member,
wherein the first adhesion means includes adhesive at at least one location,
the second adhesion means is configured such that the adhesive conducts preliminary fixing prior to curing,
the attachment member includes a fixation portion that faces the mask layer and has a bonding surface provided with both of the adhesion means, and
the fixation portion includes at least one adhesive confirmation portion through which the adhesive applied to the bonding surface can be seen from a vehicle interior side.

A method for manufacturing a vehicle provided with an information acquisition device for acquiring information from outside of the vehicle according to the present invention includes a first step of fixing a glass plate module to a front portion of the vehicle, the glass plate module including:

laminated glass in which an outer glass plate, an interlayer, and an inner glass plate are layered in this order;
a mask layer that is provided on the laminated glass and blocks a field of vision from outside; and
an attachment member that is attached to a portion corresponding to the mask layer on the inner glass plate with at least a first adhesion means and a second adhesion means and supports the information acquisition device, and
a second step of installing the information acquisition device on the glass plate module after the first step,
wherein the first adhesion means includes adhesive at at least one location,
the second adhesion means is configured such that the adhesive conducts preliminary fixing prior to curing,
the attachment member includes a fixation portion that faces the mask layer and has a bonding surface provided with both of the adhesion means, and
the fixation portion includes at least one adhesive confirmation portion through which the adhesive applied to the bonding surface can be seen from a vehicle interior side.

Advantageous Effects of the Invention

With the present invention, it can be confirmed whether or not the adhesive is present even after the attachment member is attached to the mask layer.

DESCRIPTION OF EMBODIMENTS

Figure 1:
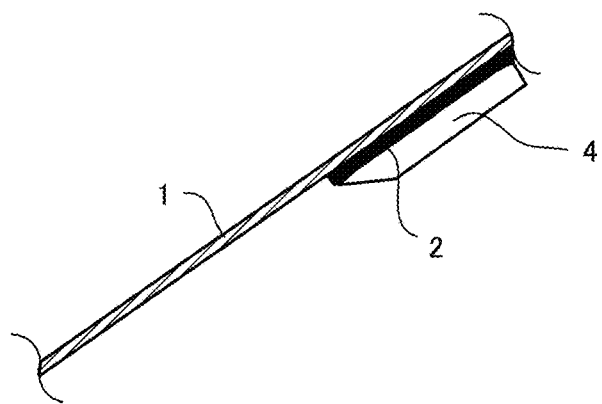
FIG. 1 is a cross-sectional view of an embodiment of a windshield according to the present invention.
Figure 2:
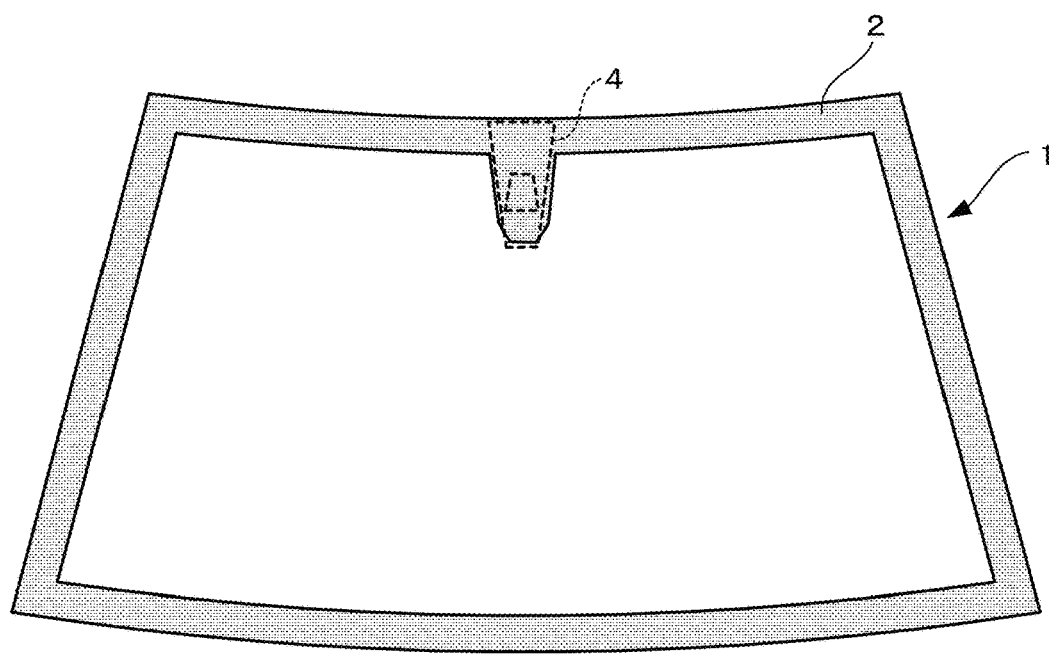
FIG. 2 is a plan view of FIG. 1.

Hereinafter, an embodiment of a glass plate module according to the present invention will be described with reference to the drawings. A glass plate module according to this embodiment is to be used as a windshield of an automobile, and a measurement unit for measuring a distance between vehicles is attached to the vehicle interior side of a glass plate. FIG. 1 is a cross-sectional view of the windshield according to this embodiment, and FIG. 2 is a plan view of FIG. 1. As shown in FIGS. 1 and 2, the windshield according to this embodiment includes a glass plate 1, a mask layer 2 that is layered on the glass plate 1, and a measurement unit 4 such as a laser radar for measuring a distance between vehicles is attached to the mask layer 2. The individual members will be described below.

1. OVERVIEW OF GLASS PLATE 1-1. Glass Plate

Figure 3:
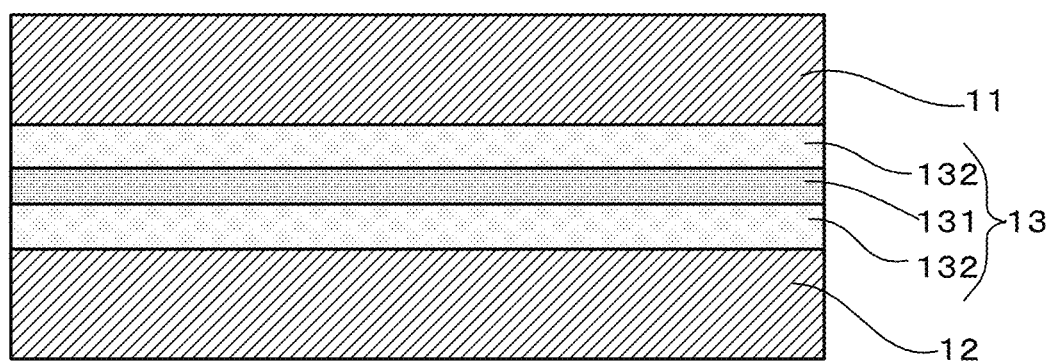
FIG. 3 is a cross-sectional view of laminated glass.

As shown in FIG. 3, the glass plate 1 according to this embodiment is constituted by laminated glass. Specifically, this laminated glass includes an outer glass plate 11 and an inner glass plate 12, and a resin interlayer 13 is arranged between the glass plates 11 and 12. First, the outer glass plate 11 and the inner glass plate 12 will be described. Known glass plates can be used as the outer glass plate 11 and the inner glass plate 12, and these glass plates can also be made of heat-ray absorbing glass, regular clear glass or green glass, or UV green glass. However, the glass plates 11 and 12 need to attain a visible light transmittance that conforms to the safety standards of a country in which the automobile is to be used. For example, an adjustment can be made so that the outer glass plate 11 ensures a required solar absorptance and the inner glass plate 12 provides a visible light transmittance that meets the safety standards. An example of the composition of clear glass, an example of the composition of heat-ray absorbing glass, and an example of the composition of soda-lime based glass are shown below.

Clear Glass
$SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R is an alkali metal)
Total iron oxide (T-$Fe_2O_3$) in terms of $Fe_2O_3$: 0.08 to 0.14 mass %

Heat-Ray Absorbing Glass
With regard to the composition of heat-ray absorbing glass, a composition obtained based on the composition of clear glass by setting the ratio of the total iron oxide (T-$Fe_2O_3$) in terms of $Fe_2O_3$ to 0.4 to 1.3 mass %, the ratio of $CeO_2$ to 0 to 2 mass o, and the ratio of $TiO_2$ to 0 to 0.5 mass % and reducing the components (mainly $SiO_2$ and $Al_2O_3$) forming the framework of glass by an amount corresponding to the increases in T-$Fe_2O_3$, $CeO_2$, and $TiO_2$ can be used, for example.

Soda-Lime Based Glass
$SiO_2$: 65 to 80 mass %
$Al_2O_3$: 0 to 5 mass %
CaO: 5 to 15 mass %
MgO: 2 mass % or more
NaO: 10 to 18 mass %
$K_2O$: 0 to 5 mass %
MgO+CaO: 5 to 15 mass %
$Na_2O+K_2O$: 10 to 20 mass %
$SO_3$: 0.05 to 0.3 mass %
$B_2O_3$: 0 to 5 mass %
Total iron oxide (T-$Fe_2O_3$) in terms of $Fe_2O_3$: 0.02 to 0.03 mass %

Although there is no particular limitation on the thickness of the laminated glass according to this embodiment, the total thickness of the outer glass plate 11 and the inner glass plate 12 is preferably set to 2.4 to 3.8 mm, more preferably 2.6 to 3.4 mm, and even more preferably 2.7 to 3.2 mm, from the viewpoint of weight reduction. As described above, there is a need to reduce the total thickness of the outer glass plate 11 and the inner glass plate 12 in order to reduce the weight. Therefore, although there is no particular limitation on the thicknesses of the glass plates, the thicknesses of the outer glass plate 11 and the inner glass plate 12 can be determined as described below, for example.

The outer glass plate 11 is mainly required to have durability and impact resistance against external interference. For example, when this laminated glass is used as a windshield of an automobile, the impact-resistance performance with respect to flying objects such as small stones is required. On the other hand, a larger thickness is not preferable because the weight increases. From this viewpoint, the thickness of the outer glass plate 11 is preferably 1.8 to 2.3 mm, and more preferably 1.9 to 2.1 mm. The thickness to be used can be determined in accordance with the application of the glass plate.

Although the thickness of the inner glass plate 12 can be made equal to that of the outer glass plate 11, the thickness of the inner glass plate 12 can be made smaller than that of the outer glass plate 11 in order to reduce the weight of the laminated glass, for example. Specifically, when the strength of the glass plate is taken into consideration, the thickness is preferably 0.6 to 2.0 mm, more preferably 0.8 to 1.6 mm, and even more preferably 1.0 to 1.4 mm. Furthermore, the thickness is preferably 0.8 to 1.3 mm. With regard to the inner glass plate 12 as well, the thickness to be used can be determined in accordance with the application of the glass plate.

The outer glass plate 11 and the inner glass plate 12 according to this embodiment have a curved shape.

Figure 4:
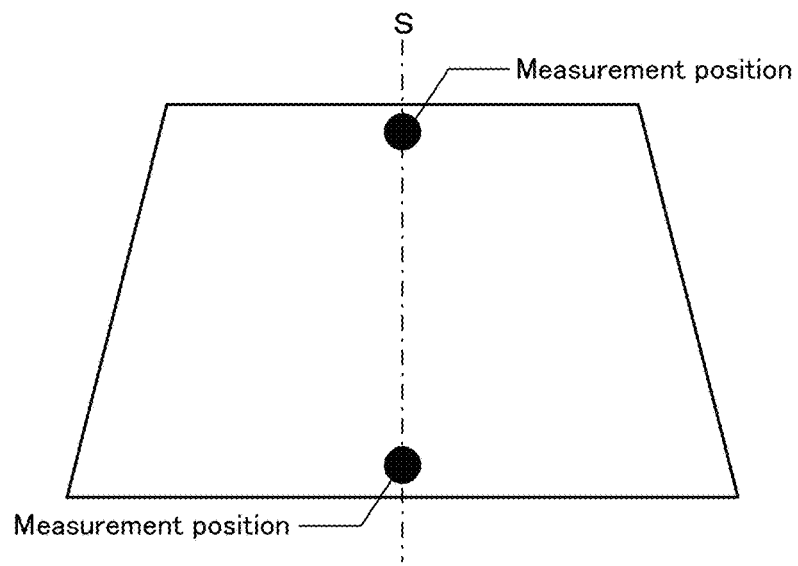
FIG. 4 is a schematic plan view showing thickness measurement positions on laminated glass.

Hereinafter, an example of a method of measuring the thickness of a curved glass plate will be described. First, with respect to the measurement position, as shown in FIG. 4, the measurement is performed at two positions: an upper position and a lower position on a center line S extending vertically in the center of a glass plate in the horizontal direction. Although there is no particular limitation on the measuring apparatus, a thickness gauge such as SM-112 manufactured by TECLOCK Corporation can be used, for example. During measurement, the glass plate is arranged such that the curved surface of the glass plate is placed on a flat surface, and an end portion of the glass plate is sandwiched and measured with the above-mentioned thickness gauge. It should be noted that a flat glass plate can also be measured in the same manner as a curved glass plate.

1-2. Interlayer

Next, the interlayer 13 will be described. The interlayer 13 includes at least one layer. For example, as shown in FIG. 3, a configuration is possible in which the interlayer 13 is constituted by three layers, namely a soft core layer 131 and outer layers 132 that are harder than the core layer 131 and between which the core layer 131 is sandwiched. However, there is no limitation to this configuration, and it is sufficient that the interlayer 13 includes a plurality of layers including the core layer 131 and at least one outer layer 132 arranged on the outer glass plate 11 side. For example, the interlayer 13 including two layers, namely the core layer 131 and one outer layer 132 arranged on the outer glass plate 11 side, or the interlayer 13 in which an even number of two or more of the outer layers 132 are arranged on each side of the core layer 131 so that the core layer 131 is arranged at the center, or the interlayer 13 in which an odd number of outer layers 132 are arranged on one side of the core layer 131 and an even number of outer layers 132 are arranged on the other side so that the core layer 131 is sandwiched therebetween can also be formed. It should be noted that in the case where only one outer layer 132 is provided, the outer layer 132 is provided on the outer glass plate 11 side as mentioned above, which is for the purpose of improving the breakage resistance performance with respect to an external force from the outside of a vehicle or a building. Moreover, when the number of outer layers 132 is increased, the sound insulation performance is improved.

Although there is no particular limitation on the hardness of the core layer 131 as long as the core layer 131 is softer than the outer layer 132, materials of the core layer 131 can be selected based on the Young's modulus, for example. Specifically, at a frequency of 100 Hz and a temperature of 20° C., the Young's modulus is preferably 1 to 25 MPa, more preferably 1 to 20 MPa, even more preferably 1 to 18 MPa, and even more preferably 1 to 14 MPa. When the Young's modulus is set to be in such a range, it is possible to prevent a decrease in sound transmission loss in a low frequency range of about 3500 Hz or lower.

In this regard, the inventors of the present invention found that, in general, a reduction in the Young's modulus of the core layer resulted in an improvement of the sound insulation performance in a frequency range of 3000 to 5000 Hz. In this regard, Table 1 below shows the sound insulation performance of laminated glass having an outer glass plate and an inner glass plate made of clear glass, and an interlayer including a core layer and outer layers located on both sides of this core layer. The outer glass plate has a thickness of 2.0 mm, the inner glass plate has a thickness of 1.3 mm, and the interlayer has a thickness of 0.76 mm, with the core layer having a thickness of 0.10 mm and each of the outer layers having a thickness of 0.33 mm. Table 1 below shows the sound transmission losses in a frequency range of 1250 to 10000 Hz. Specifically, the sound transmission losses are calculated in a case where the Young's modulus (measured at a frequency of 100 Hz and a temperature of 20° C.) of the core layer of the interlayer is set to 25 MPa, 12.5 MPa, and 6.25 MPa (the calculation method is in accordance with a method in Examples, which will be described later), the sound transmission losses in the case where the Young's modulus is set to 25 MPa are used as references (the sound transmission losses in this case are shown as 0 in the table below because they are used as references), and differences in sound transmission loss (in dB) when the Young's modulus is set to 12.5 MPa and 6.25 MPa are shown. In this case, the outer layers have a Young's modulus of 560 MPa and a tan γ of 0.26 (temperature 20° C., frequency 100 Hz). It can be seen from Table 1 that in a frequency range of 3150 to 5000 Hz, the sound transmission loss is improved as the Young's modulus of the core layer of the interlayer is reduced from 25 MPa to 12.5 MPa and 6.25 MPa.

TABLE 1

|          | 1250 | 1600 | 2000 | 2500 | 3150 | 4000 | 5000 | 6300 | 8000 | 10000 |
|----------|------|------|------|------|------|------|------|------|------|-------|
| 6.25 MPa | 0.3  | 0.6  | 1.1  | 1.7  | 2.2  | 2.3  | 0.3  | −2.4 | −1.7 | −1.2  |
| 12.5 MPa | 0.1  | 0.3  | 0.6  | 0.9  | 1.3  | 1.3  | 0    | −1.1 | −0.8 | −0.5  |
| 25 MPa   | 0.0  | 0.0  | 0.0  | 0.0  | 0.0  | 0.0  | 0.0  | 0.0  | 0.0  | 0.0   |

With regard to the measurement method, it is possible to use a solid viscoelasticity measuring apparatus DMA 50 manufactured by Metravib and perform frequency dispersion measurement with a strain amount of 0.05%, for example. In the following description, the Young's modulus as used herein refers to a measurement value obtained by using the above-described method, unless otherwise stated. However, although an actual measured value is used in measurement at a frequency lower than or equal to 200 Hz, a value that is calculated based on actual measured values is used at a frequency higher than 200 Hz. This calculated value is based on a master curve that is calculated from actual measured values using the WLF method.

On the other hand, as described later, it is preferable that the outer layers 132 have a large Young's modulus for the purpose of improving the sound insulation performance in a high frequency range, and the Young's modulus can be set to 560 MPa or more, 600 MPa or more, 650 MPa or more, 700 MPa or more, 750 MPa or more, 880 MPa or more, or 1300 MPa or more at a frequency of 100 Hz and a temperature of 20° C. On the other hand, there is no particular limitation on the upper limit of the Young's modulus of each of the outer layers 132, but the Young's modulus can be set from the viewpoint of workability, for example. It is empirically known that when the Young's modulus is set to 1750 MPa or more, for example, the workability decreases, and in particular, cutting is difficult. Moreover, it is preferable to set the Young's modulus of the outer layer on the outer glass plate 11 side to be greater than the Young's modulus of the outer layer on the inner glass plate 12 side. This makes it possible to improve the breakage resistance performance with respect to an external force from the outside of a vehicle or a building.

At a frequency of 100 Hz and a temperature of 20° C., tan δ of the core layer 131 can be set to 0.1 to 0.9. When tan δ is within the above-mentioned range, the sound insulation performance is improved.

In this regard, the inventors of the present invention found that, in general, an increase in tan δ of the core layer resulted in an improvement of the sound insulation performance in a frequency range of 5000 to 10000 Hz. In this regard, Table 2 below shows the sound insulation performance of laminated glass having an outer glass plate and an inner glass plate made of clear glass, and an interlayer including a core layer and outer layers located on both sides of this core layer. The outer glass plate has a thickness of 2.0 mm, the inner glass plate has a thickness of 1.3 mm, and the interlayer has a thickness of 0.76 mm, with the core layer having a thickness of 0.10 mm and each of the outer layers having a thickness of 0.33 mm. It should be noted that, in this case, the Young's moduli of the core layer and the outer layers are 12.5 MPa and 560 MPa (measured at a frequency of 100 Hz and a temperature of 20° C.), respectively. Table 2 below shows the sound transmission losses in a frequency range of 1250 to 10000 Hz. Specifically, the sound transmission losses are calculated in a case where tan δ (measured at a frequency of 100 Hz and a temperature of 20° C.) of the interlayer is set to 0.8, 1.2, and 1.6, the sound transmission losses in the case where tan δ is set to 0.8 are used as references (the sound transmission losses in this case are shown as 0 in the table below because they are used as references), and differences in sound transmission loss (in dB) when tan δ is set to 1.2 and 1.6 are shown. It should be noted that the outer layers have a tan δ of 0.26. It can be seen from Table 2 that in a frequency range of 5000 to 10000 Hz, the sound transmission loss is improved as tan δ of the interlayer is increased from 0.8 to 1.2 and 1.6.

TABLE 2

|     | 1250 | 1600 | 2000 | 2500 | 3150 | 4000 | 5000 | 6300 | 8000 | 10000 |
|-----|------|------|------|------|------|------|------|------|------|-------|
| 1.6 | −0.1 | −0.2 | −0.3 | −0.4 | −0.4 | 0.2  | 1.4  | 2.0  | 1.5  | 1.2   |
| 1.2 | 0.0  | −0.1 | −0.2 | −0.2 | −0.2 | 0.2  | 0.9  | 1.2  | 0.9  | 0.7   |
| 0.8 | 0.0  | 0.0  | 0.0  | 0.0  | 0.0  | 0.0  | 0.0  | 0.0  | 0.0  | 0.0   |

Although there is no particular limitation on the materials constituting the layers 131 and 132, the materials are required to be such that at least the Young's moduli of the layers can be set within respective ranges as described above. The layers 131 and 132 can be made of a resin material, for example. Specifically, the outer layers 132 can be made of a polyvinyl butyral resin (PVB). A polyvinyl butyral resin has excellent adhesiveness to the glass plates and penetration resistance and is thus preferable. On the other hand, the core layer 131 can be made of an ethylene vinyl acetate resin (EVA) or a polyvinyl acetal resin that is softer than the polyvinyl butyral resin constituting the outer layers 132. When the soft core layer 131 is sandwiched between the outer layers, it is possible to significantly improve the sound insulation performance while keeping the adhesiveness and the penetration resistance that are equivalent to those of a single-layered resin interlayer.

In general, the hardness of a polyvinyl acetal resin can be controlled by adjusting (a) the degree of polymerization of polyvinyl alcohol, which is the starting material, (b) the degree of acetalization, (c) the type of plasticizer, (d) the ratio of the plasticizer added, and the like. Accordingly, a hard polyvinyl butyral resin that is used for the outer layers 132 and a soft polyvinyl butyral resin that is used for the core layer 131 can be produced, which are both polyvinyl butyral resin, by appropriately adjusting at least one condition selected from the aforementioned conditions. Furthermore, the hardness of a polyvinyl acetal resin can be controlled based on the type of aldehyde that is used for acetalization and whether co-acetalization using a plurality of kinds of aldehydes or pure acetalization using a single kind of aldehyde is performed. Although not necessarily applicable to every case, the larger the number of carbon atoms of the aldehyde that is used to obtain a polyvinyl acetal resin is, the softer the resulting polyvinyl acetal resin tends to be. Accordingly, for example, if the outer layers 132 are made of a polyvinyl butyral resin, a polyvinyl acetal resin that is obtained by acetalizing an aldehyde having 5 or more carbon atoms (e.g., n-hexyl aldehyde, 2-ethylbutyl aldehyde, n-heptyl aldehyde, or n-octyl aldehyde) with polyvinyl alcohol can be used for the core layer 131. It should be noted that there is no limitation to the above-mentioned resins and the like as long as predetermined Young's moduli can be obtained.

The total thickness of the interlayer 13 is not particularly specified, but is preferably 0.3 to 6.0 mm, more preferably 0.5 to 4.0 mm, and even more preferably 0.6 to 2.0 mm. Meanwhile, the thickness of the core layer 131 is preferably 0.1 to 2.0 mm and more preferably 0.1 to 0.6 mm. On the other hand, it is preferable that the thickness of each of the outer layers 132 is larger than the thickness of the core layer 131. Specifically, the thickness of each of the outer layers 132 is preferably 0.1 to 2.0 mm and more preferably 0.1 to 1.0 mm. Alternatively, it is also possible to fix the total thickness of the interlayer 13 and adjust the thickness of the core layer 131 without exceeding the fixed total thickness.

Figure 5:
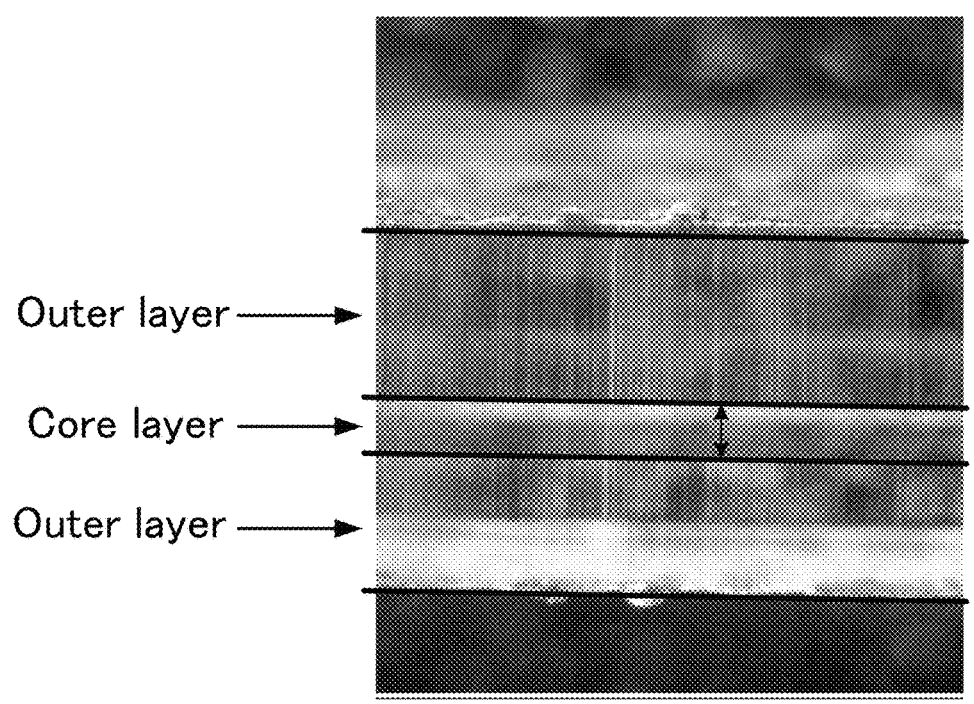
FIG. 5 is an example of an image that is used for measurement of an interlayer.

The thicknesses of the core layer 131 and the outer layers 132 can be measured as described below, for example. First, the cross section of laminated glass is magnified by a factor of 175 and displayed using a microscope (e.g., VH-5500 manufactured by Keyence Corporation). Then, the thicknesses of the core layer 131 and the outer layers 132 are visually identified and measured. At this time, in order to eliminate variations seen in visual identification, the measurement is performed five times, and average values are taken as the thicknesses of the core layer 131 and the outer layers 132. For example, an enlarged photograph of laminated glass as shown in FIG. 5 is taken, in which the core layer and the outer layers 132 have been identified, and the thicknesses of the identified core layer and outer layers 132 are measured.

It should be noted that the core layer 131 and the outer layers 132 of the interlayer 13 are not required to have a constant thickness over the entire surface. For example, the core layer 131 and the outer layers 132 can also be formed in a wedge shape so as to be suited to laminated glass that is used for a head-up display. In this case, the thicknesses of the core layer 131 and the outer layers 132 of the interlayer 13 are measured at positions having the smallest thickness, that is, at the lowest side portion of the laminated glass. If the interlayer 3 has a wedge shape, the outer glass plate and the inner glass plate are not arranged in parallel, but it should be construed that such an arrangement is also included in the arrangement of the glass plates of the present invention. That is, the arrangement according to the present invention includes the arrangement of the outer glass plate 11 and the inner glass plate 12 when the interlayer 13 including the core layer 131 and the outer layers 132 whose thicknesses increase at a rate of change of 3 mm or less per meter is used, for example.

Although there is no particular limitation on the method for manufacturing the interlayer 13, examples thereof include a method in which a resin component such as the above-described polyvinyl acetal resin, a plasticizer, and other additives, if necessary, are mixed and uniformly kneaded, and then the layers are collectively extruded, and a method in which two or more resin films that are produced using this method are laminated with a pressing process, a lamination process, or the like. In the method of laminating with the pressing process, the lamination process, or the like, each of the resin films before laminating may have a single-layer structure or a multilayer structure. Moreover, the interlayer 13 may include a single layer instead of the plurality of layers as mentioned above.

1-3. Infrared Transmittance of Glass Plate

As mentioned above, the windshield according to this embodiment is used for an automobile front safety system using a measurement unit such as a laser radar or a camera. In such safety systems, infrared rays are emitted toward a preceding vehicle to measure the velocity of a preceding automobile and the distance to the preceding automobile. Therefore, infrared transmittance in a predetermined range is required to be achieved in the laminated glass (or a single glass plate).

With regard to such a transmittance, when a regular sensor is used in a laser radar, for example, a useful transmittance with respect to light (infrared rays) having a wavelength of 850 to 950 nm is 20% or more and 80% or less, and preferably 20% or more and 60% or less. A method for measuring transmittance is performed in accordance with JIS R3106, and UV3100 (manufactured by Shimadzu Corporation) can be used as a measurement apparatus. Specifically, a transmittance with respect to unidirectional light that is emitted at a right angle to the surface of the laminated glass is measured.

Some of the safety systems as mentioned above use not a laser radar but an infrared camera to measure the velocity of a preceding vehicle and the distance to the preceding vehicle. In such a case, when a regular camera is used in a laser radar, for example, a useful transmittance with respect to light (infrared rays) having a wavelength of 700 to 800 nm is 30% or more and 80% or less, and preferably 40% or more and 60% or less. A method of measuring transmittance is performed in accordance with ISO9050.

2. MASK LAYER

Figure 6:
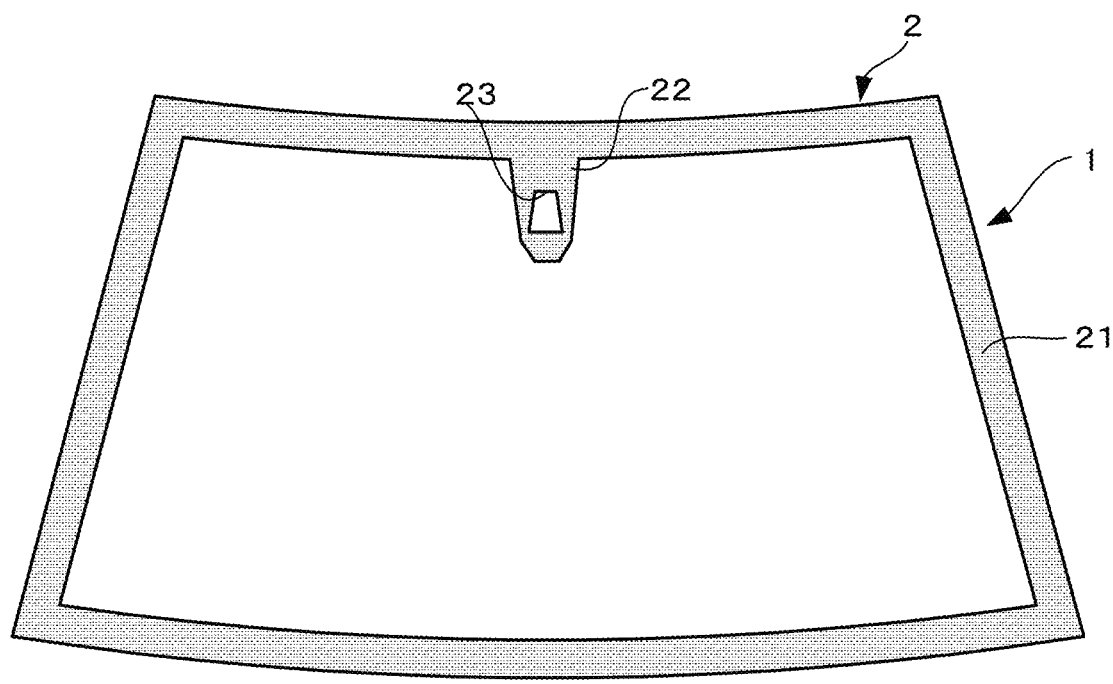
FIG. 6 is a plan view of a glass plate.

Next, the mask layer 2 will be described. The mask layer 2 as shown in FIG. 6 is formed on the glass plate 1 according to this embodiment. The mask layer 2 is layered on the glass plate, but there is no particular limitation on its position. Specifically, the mask layer 2 can be layered on at least one of the surface on the vehicle interior side of the outer glass plate 11, the surface on the vehicle exterior side of the inner glass plate 12, and the surface on the vehicle interior side of the inner glass plate 12. It is preferable that the mask layers 2 having substantially the same shape are formed on both the surface on the vehicle interior side of the outer glass plate 11 and the surface on the vehicle interior side of the inner glass plate 12, for example, out of these surfaces because portions of the glass plates 11 and 12 on which the mask layers 2 are layered are curved in the same manner.

The mask layer 2 serves as a dark-colored region for concealing, from the outside, adhesive that is applied to attach the glass plate 1 to a vehicle body, and the like, and includes a peripheral edge mask layer 21 that is formed at the outer peripheral edge of the glass plate 1 and a center mask layer 22 that extends downward from the peripheral edge mask layer 21 at the center of the upper edge of the glass plate 1. The above-described measurement unit 4 is attached to the center mask layer 22. It is sufficient that the measurement unit 4 is arranged such that light emitted by a sensor passes through the center of an opening and light reflected by a preceding vehicle and an obstacle can be received, as described later. Although various materials can be used to form the mask layer 2, there is no limitation on the materials as long as the mask layer 2 can block a field of vision from the outside of the vehicle, and the mask layer 2 can be formed by applying ceramic of a dark color such as black to the glass plate 1, for example.

Figure 7:
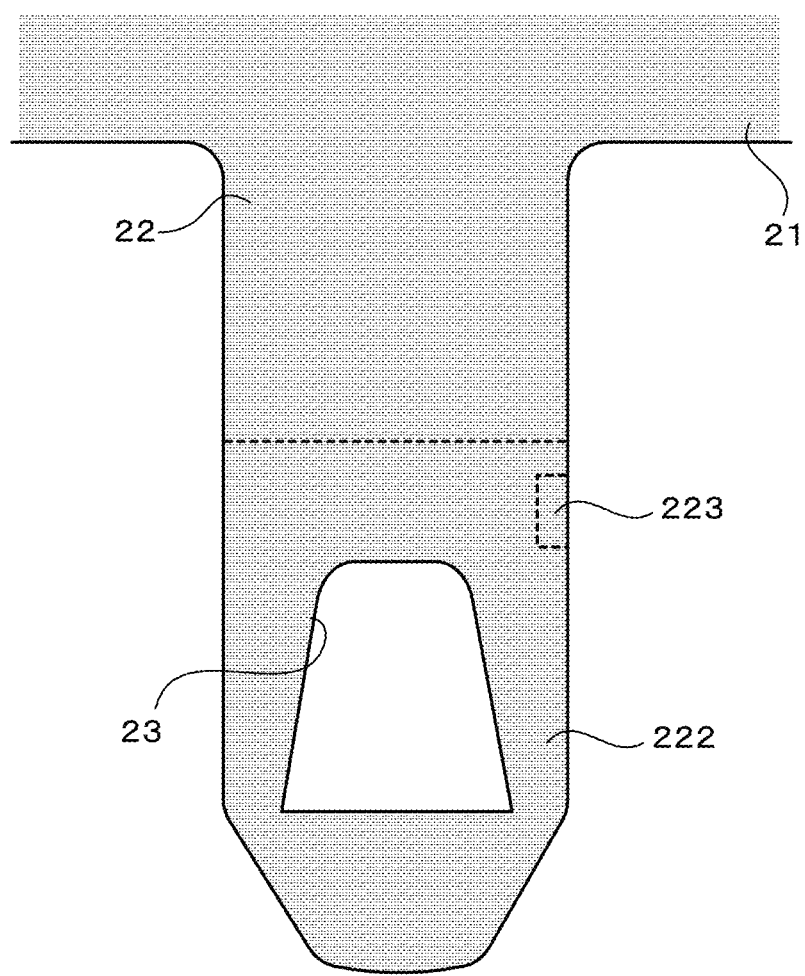
FIG. 7 is an enlarged plan view of a center mask layer.

Next, the center mask layer 22 will be described. As shown in FIG. 7, the center mask layer 22 is formed in a rectangular shape that extends vertically, and a rectangular opening 23 is formed in the center mask layer 22.

The center mask layer 22 has three regions, and is constituted by an upper region 221 that is located on the upper side with respect to the opening 23, a lower region 222 that is located on the lower side with respect to this upper region 221 and in which the opening 23 is formed, and a small rectangular lateral region 223 that is formed in the lateral portion of this lower region 222.

Figure 8:
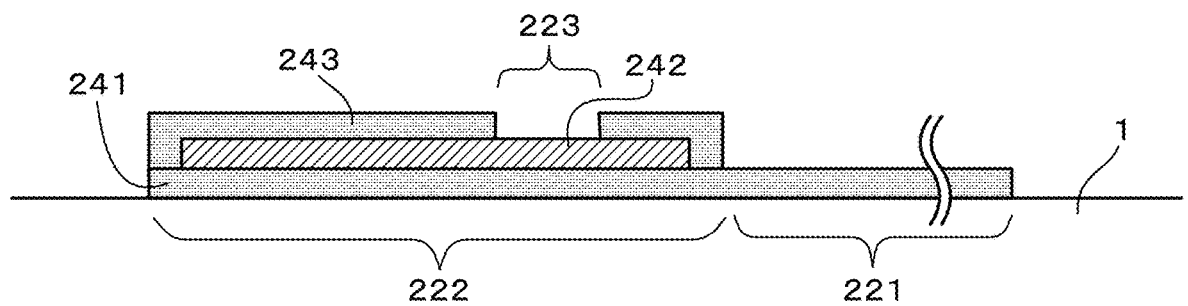
FIG. 8 is a cross-sectional view of FIG. 7.

Next, the layer configurations of the respective regions will be described. As shown in FIG. 8, the upper region 221 includes a single first ceramic layer 241 made of black ceramic. The lower region 222 includes three layers that are layered on the inner surface of the glass plate 1, namely the above-mentioned first ceramic layer 241, a silver layer 242, and a second ceramic layer 243. The silver layer 242 is made of silver, and the second ceramic layer 243 is made of the same material as the material of the first ceramic layer 241. The lateral region 223 includes two layers that are layered on the inner surface of the glass plate 1, namely the first ceramic layer 241 and the silver layer 242, and the silver layer 242 is exposed to the vehicle interior side. The first ceramic layer 241, which is the undermost layer, is shared by all the regions, and the silver layer 242, which is the second layer, is shared by the lower region 222 and the lateral region 223. It should be noted that the thicknesses of the ceramic layers 241 and 243 can be set to 10 to 20 μm, for example, in order to secure a light blocking property. Moreover, as described later, a bracket of the measurement unit 4 is bonded, with adhesive, to the center mask layer 22 formed on the surface on the vehicle interior side of the inner glass plate 12, and therefore, such a thickness is preferable in order to secure an adhesive property as well. This is because there is a risk that a urethane-silicone based adhesive may be deteriorated by ultraviolet rays or the like, for example.

The peripheral edge mask layer 21 and the center mask layer 22 can be formed as described below, for example. First, the first ceramic layer 241 is applied to the glass plate. This first ceramic layer 241 is shared with the peripheral edge mask layer 21. Next, the silver layer 242 is applied to the regions corresponding to the lower region 222 and the lateral region 223 on the first ceramic layer 241. Lastly, the second ceramic layer 243 is applied to the region corresponding to the lower region 222. It should be noted that, in the lower region 222, the region in which the silver layer 242 is formed corresponds to the position at which the sensor of the measurement unit 4, which will be described later, is arranged. Moreover, the silver layer 242, which is exposed in the lateral region 223, is provided with wiring for grounding. Although the ceramic layers 241 and 243 and the silver layer 242 can be formed using a screen printing process, these layers can also be produced, in addition, by transferring a transfer film for firing to the glass plate and firing it.

Although various materials can be used to form the ceramic layers 241 and 243, the composition listed below can be used, for example.

TABLE 3

|  |  | First and second colored ceramics pastes |
|---|---|---|
| Pigment *1 | mass % | 20 |
| Resin (cellulose resin) | mass % | 10 |
| Organic solvent (pine oil) | mass % | 10 |
| Glass binder *2 | mass % | 65 |
| Viscosity | dPs | 150 |

*1 Main components: copper oxide, chromium oxide, iron oxide, and manganese oxide
*2 Main components: bismuth borosilicate, zinc borosilicate Although there is no particular limitation on the composition of the silver layer 242, the composition listed below can be used, for example.

TABLE 4

|  |  | Conductive ceramics pastes |
|---|---|---|
| Silver particles (average particle diameter: 10 μm) | mass % | 70 |
| Glass binder *1 | mass % | 10 |
| Resin (cellulose resin) | mass % | 5 |
| Organic medium (terpineol) | mass % | 15 |
| Viscosity | dPs | 180 |

*1 Main components: bismuth borosilicate, zinc borosilicate

The screen printing can be performed under the conditions that a polyester screen of 355 mesh is used, the coating thickness is 20 μm, the tension is 20 Nm, the squeegee hardness is 80 degrees, the attachment angle is 75°, and the printing speed is 300 mm/s, for example, and the ceramic layers and the silver layer can be formed by performing drying in a drying furnace at 150° C. for 10 minutes. It should be noted that when the first ceramic layer 241, the silver layer 242, and the second ceramic layer 243 are layered in this order, it is sufficient that the above-described screen printing and drying are repeated.

3. METHOD FOR MANUFACTURING WINDSHIELD

Next, a method for manufacturing a windshield will be described. First, a manufacturing line for a glass plate will be described.

Figure 9:
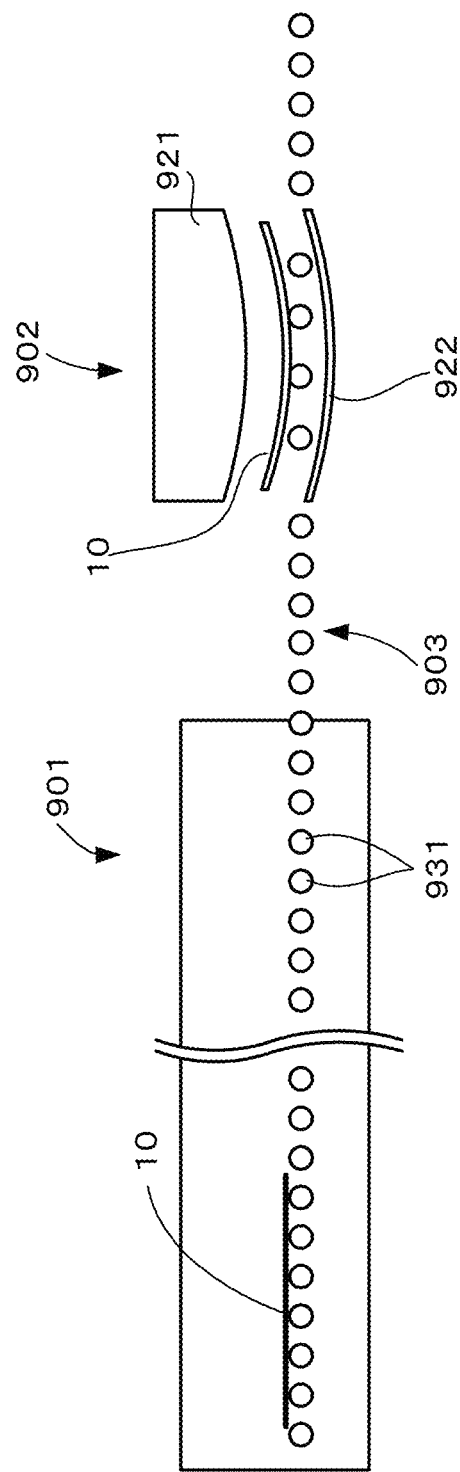
FIG. 9 is a side view showing an example of a method for manufacturing a glass plate.

As shown in FIG. 9, a heating furnace 901 and a molding apparatus 902 are arranged in this order from the upstream side to the downstream side in this manufacturing line. A roller conveyor 903 is arranged extending from the heating furnace 901 via the molding apparatus 902 toward the downstream side of the molding apparatus 902, and a glass plate 10 to be processed is conveyed using this roller conveyor 903. The glass plate 10 has a flat shape until it is conveyed into the heating furnace 901. After the above-described mask layer 2 is layered on this glass plate 10, the glass plate 10 is conveyed into the heating furnace 901.

The heating furnace 901 can be variously configured, and an example thereof is an electric heating furnace. This heating furnace 901 includes a furnace main body having a polygonal tube shape in which end portions on the upstream side and the downstream side are open, and the roller conveyor 903 is arranged inside the furnace main body and extends from the upstream side toward the downstream side. Heaters (not shown) are respectively arranged on the upper surface, the lower surface, and a pair of lateral surfaces of the inner wall surface of the furnace main body, and heat the glass plate 10 passing through the heating furnace 901 to a temperature at which the glass plate 10 can be molded, such as a temperature near a softening point of glass.

The molding apparatus 902 is configured to press the glass plate using an upper mold 921 and a lower mold 922 to mold the glass plate into a predetermined shape. The upper mold 921 has a curved shape protruding downward that covers the entire top surface of the glass plate 10, and is configured to be capable of moving up and down. The lower mold 922 is formed in a frame shape that corresponds to the peripheral edge portion of the glass plate 10, and its top surface has a curved shape so as to correspond to the upper mold 921. With this configuration, the glass plate 10 is molded into a final curved shape through press molding between the upper mold 921 and the lower mold 922. The roller conveyor 903 is arranged inside the frame of the lower mold 922 and is configured to be capable of moving up and down so as to pass through the inside of the frame of the lower mold 922. Although not shown, an annealing apparatus (not shown) is arranged on the downstream side of the molding apparatus 902 and cools the molded glass plate.

The roller conveyor 903 as mentioned above is a known roller conveyor and has a configuration in which a plurality of rollers 931 that are each rotatably supported at both end portions are arranged at a predetermined interval. Various methods can be used to drive the rollers 931, and an example thereof is a method in which a sprocket is attached to an end portion of each of the rollers 931 and a chain is wound around the sprockets to drive the rollers 931. The conveying speed of the glass plate 10 can be adjusted by adjusting the rotation speed of the rollers 931. It should be noted that the lower mold 922 of the molding apparatus 902 may have a shape that can be in contact with the entire surface of the glass plate 10. In addition, there is no particular limitation on the shapes of the upper mold and the lower mold as long as the glass plate can be molded using the molding apparatus 902.

After the outer glass plate 11 and the inner glass plate 12 are molded in this manner, the interlayer 13 is sandwiched between the outer glass plate 11 and the inner glass plate 12, and these are placed into a rubber bag and preliminarily bonded together at about 70 to 110° C. under vacuum suction. Preliminary bonding can be performed using a method other than this method. For example, the interlayer 13 is sandwiched between the outer glass plate 11 and the inner glass plate 12, and these are heated at 45 to 65° C. in an oven. Subsequently, this laminated glass is pressed by a roller at 0.45 to 0.55 MPa. Then, this laminated glass is again heated at 80 to 105° C. in an oven and thereafter again pressed by a roller at 0.45 to 0.55 MPa. Thus, preliminary bonding is finished.

Next, permanent bonding is performed. The preliminarily bonded laminated glass is permanently bonded using an autoclave at a pressure of 8 to 15 atmospheres and at 100 to 150° C., for example. Specifically, permanent bonding can be performed in the conditions of a pressure of 14 atmospheres and 145° C., for example. Thus, the laminated glass according to this embodiment is manufactured.

Moreover, in attaching such laminated glass to an automobile, the attachment angle of the laminated glass is preferably set to an angle of 45 degrees or less to the vertical.

4. MEASUREMENT UNIT

Figure 10:
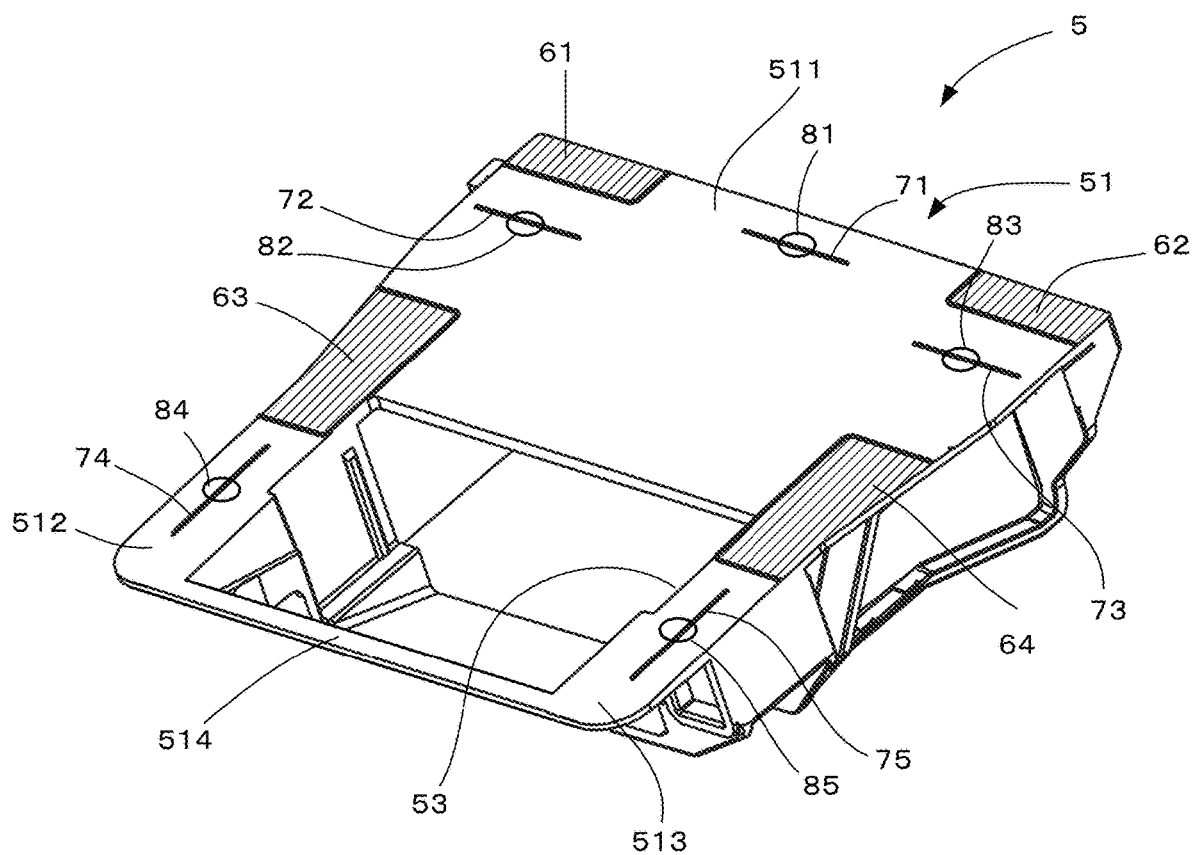
FIG. 10 is a perspective view of a bracket as viewed from a vehicle exterior side.

Next, the measurement unit will be described with reference to FIGS. 10 and 11. FIG. 10 is a perspective view of a bracket as viewed from a vehicle exterior side, and FIG. 11 is a perspective view of the bracket as viewed from a vehicle interior side.

This measurement unit 4 includes a bracket (attachment member) 5 that is fixed to the inner surface of the glass plate 1, the sensor (not shown) that is supported by the bracket 5, and a cover (not shown) that covers the bracket 5 and the sensor from the vehicle interior side.

Figure 11:
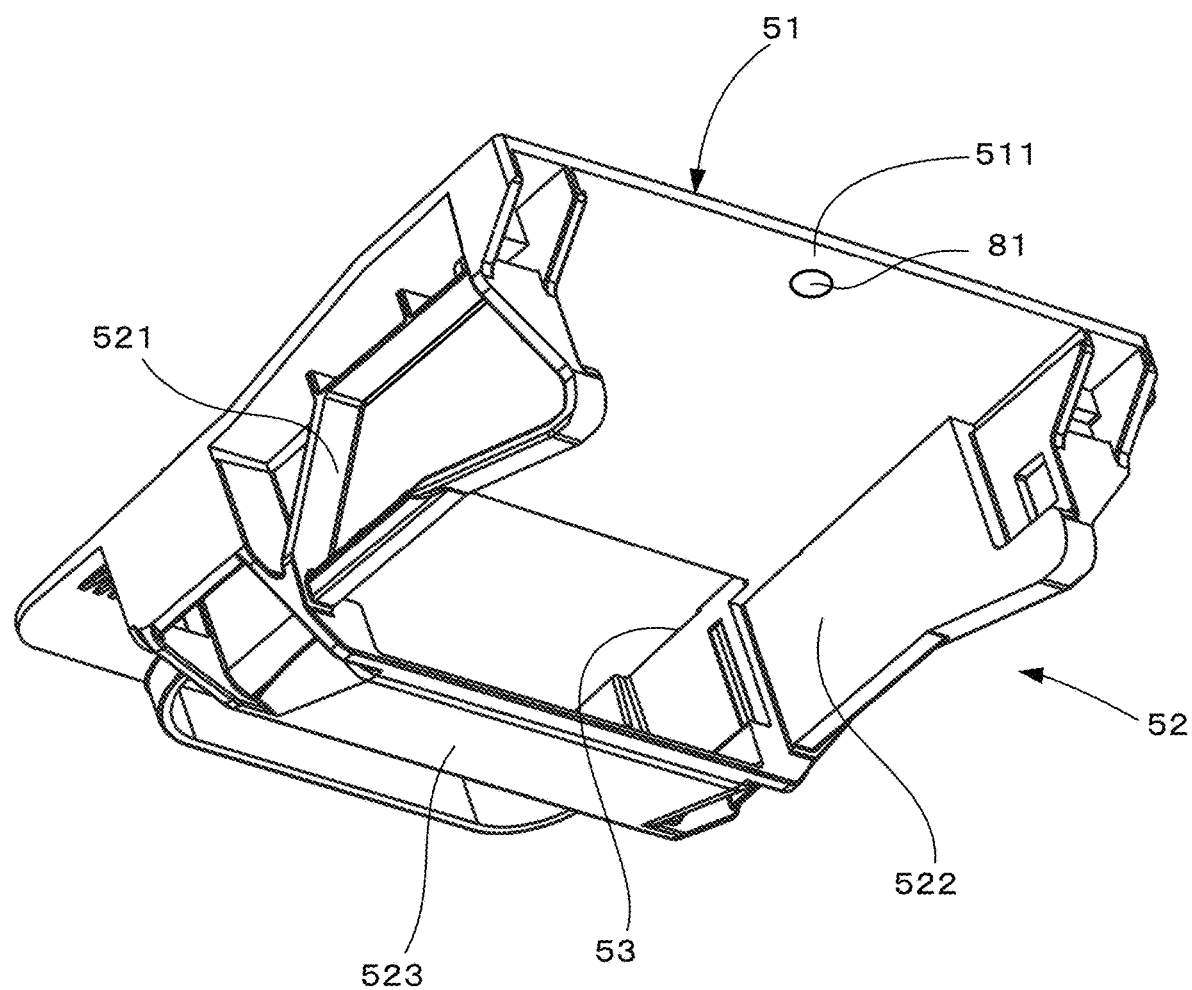
FIG. 11 is a perspective view of the bracket as viewed from a vehicle interior side.

As shown in FIGS. 10 and 11, the bracket 5 includes a plate-shaped fixation portion 51 that is fixed to the center mask layer 22, and a supporting portion 52 that is provided on the surface on the vehicle interior side of the fixation portion 51 and supports the sensor. The fixation portion 51 includes an upper side portion 511 that extends horizontally, a pair of lateral side portions 512 and 513 that extend downward from both sides of the upper side portion 511, and a lower side portion 514 that couples the lower ends of the lateral side portions 512 and 513, and is formed in a rectangular shape as a whole. A rectangular front opening 53 surrounded by the side portions 512 to 514 corresponds to the opening 23 of the center mask layer 22, and the sensor emits and receives light through this front opening 53. In the side portions 512 to 514, the surfaces facing the center mask layer 22 are flat, and form a bonding surface to be bonded to the center mask layer 22.

As shown in FIG. 11, the supporting portion 52 includes a pair of supporting pieces 521 and 522 that rise from the lateral side portions 512 and 513 toward the vehicle interior side, and a coupling portion 523 that couples the supporting pieces 521 and 522 together. The coupling portion 523 is arranged at a position corresponding to the front opening 53 and extends in a horizontal direction. The sensor is supported by the supporting pieces 521 and 522 so as to emit and receive light through the front opening 53. Although not shown, the cover is attached to the bracket 5 from the vehicle interior side and covers the surface on the vehicle interior side of the bracket 5 and the sensor. On the other hand, the center mask layer 22 has been formed, and therefore, the measurement unit 4 also cannot be seen from the vehicle exterior side with the exception of the opening 23.

The bonding surface of the fixation portion 51 is fixed to the center mask layer 22 with double-sided adhesive tape and adhesive. This point will be described in detail. As shown in FIG. 10, in the bracket 5 according to this embodiment, the double-sided adhesive tape is stuck to four positions on the bonding surface, and the adhesive is applied to five positions in a linear manner. The double-sided adhesive tape is formed in a rectangular shape. With regard to four pieces of the double-sided adhesive tape, first and second double-sided adhesive tapes 61 and 62 are stuck to two positions on both sides of the upper side portion 511, and third and fourth double-sided adhesive tapes 63 and 64 are stuck to two positions at which the upper side portion 511 is coupled to the lateral side portions 512 and 513. It should be noted that the thicknesses of the pieces of double-sided adhesive tape 61 to 64 are preferably 0.2 to 0.8 mm, for example. For this reason, even when the bracket 5 is pressed against the center mask layer 22, a clearance corresponding to the thicknesses of the pieces of double-sided adhesive tape 61 to 64 is ensured between the bonding surface and the center mask layer 22. As a result, the thickness of the adhesive can be ensured, and the adhesive is prevented from being spread excessively when compressed.

On the other hand, with regard to the adhesive applied to the five positions, a first adhesive 71 is arranged between the first and second double-sided adhesive tapes 61 and 62, second and third adhesives 72 and 73 are arranged at positions below the first and second double-sided adhesive tapes 61 and 62, and fourth and fifth adhesives 74 and 75 are arranged at positions below the third and fourth double-sided adhesive tapes 63 and 64. The first to third adhesives 71 to 73 are applied so as to extend in the horizontal direction, and the fourth and fifth adhesives 74 and 75 are applied so as to extend in the vertical direction.

In the fixation portion 51, through holes 81 to 85 are formed at the positions at which the above-mentioned adhesives 71 to 75 are applied. The through holes 81 to 85 are open at the surface on the vehicle exterior side of the fixation portion 51 and the surface on the vehicle interior side thereof, and can be seen from the vehicle interior side in the state in which the cover is not attached. The above-mentioned adhesives 71 to 75 are applied so as to pass over the through holes 81 to 85.

Figure 12:
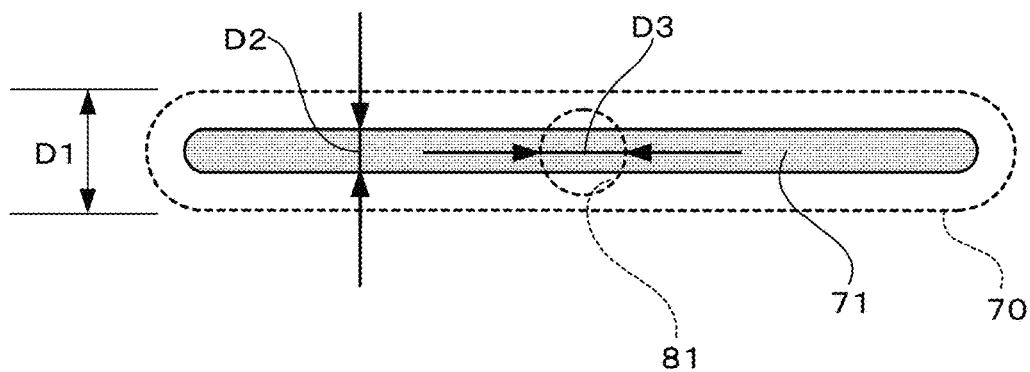
FIG. 12 is a plan view showing a positional relationship between adhesive and a through hole.

Next, the sizes of the adhesives and the through holes will be described with reference to FIG. 12. There is no particular limitation on a width D2 of each of the above-mentioned adhesives 71 to 75, but, as shown in FIG. 12, the adhesive applied with a width of 2 to 3 mm is spread out to a width D1 of about 10 mm when the bracket 5 is pressed against the center mask layer 22 and bonded thereto. A region in which the spread-out adhesive 71 is present is referred to as "spread-out region 70", and the same applies to the following description. The through holes 81 to 85 can be formed in various shapes such as a rectangular shape, a circular shape, an elliptic shape, and a polygonal shape. When the adhesives 71 to 75 are applied to the bonding surface, it is necessary at least to apply the adhesives 71 to 75 over the through holes 81 to 85 so as not to be divided by the through holes 81 to 85. Therefore, diameters D3 of the through holes in the extending directions of the adhesives 71 to 75 are preferably 2 to 5 mm when the widths of the adhesives 71 to 75 are 2 to 3 mm, for example.

Various types of adhesive can be used as the adhesives 71 to 75, and examples thereof include urethane resin adhesive and epoxy resin adhesive. It should be noted that the epoxy resin adhesive is advantageous because it has high viscosity and thus is less likely to flow.

Next, the sensor will be described. Known sensors can be used as this sensor. Although the description and diagrams of specific aspects of the sensor are omitted, the sensor can be configured such that a laser emitting element emits a laser beam and a light receiving element receives reflected light, which is reflected by a preceding vehicle or an obstacle, via a light receiving lens, for example. The distance from the preceding vehicle or the obstacle to the subject vehicle is calculated based on the time until the light receiving element receives the reflected light. The calculated distance is transmitted from the sensor to an external device and used for control of a brake and the like.

The above-mentioned bracket 5 is fixed to the mask layer 2 on the glass plate 1 using the adhesives 71 to 75 and the double-sided adhesive tapes 61 to 64, and the glass plate module according to this embodiment is thus obtained. Thereafter, the sensor and the cover are attached to this glass plate module to form a window module. In a process for manufacturing a vehicle, specifically, the glass plate module is fixed to a window frame in the front portion of a vehicle, and the cover is then attached to the bracket 5 and the sensor. At this time, the wiring of the sensor is carried out.

5. FEATURES

Figure 13:
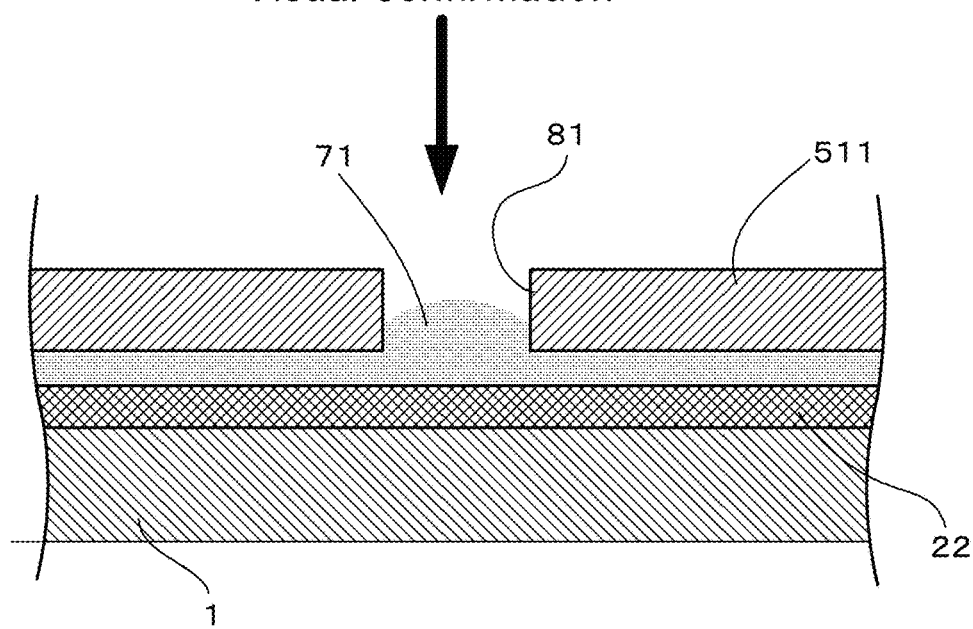
FIG. 13 is a diagram illustrating visual confirmation of the adhesive.

As described above, with this embodiment, the through holes 81 to 85 are formed in the fixation portion 51 of the bracket 5, and the adhesives 71 to 75 are applied so as to pass over the through holes 81 to 85. Therefore, after the bracket 5 is fixed to the center mask layer 22, it can be confirmed whether or not the adhesive 71 is present from the vehicle interior side via the through hole 81 as shown in FIG. 13. In particular, the sensor is not lightweight, and therefore, when the bracket 5 is fixed to the mask layer 2 using only the double-sided adhesive tapes 61 to 64 without the application of adhesive, there is a risk that the bracket 5 will come off the mask layer 22 due to insufficient adhesive strength. Accordingly, it is very important to confirm whether or not the adhesive is present. Moreover, in the manufacturing process described above, an operator who attaches the glass plate module to a vehicle is often different from an operator who attaches the sensor to the bracket 5, and therefore, it should be necessary to easily confirm whether or not the adhesive is present in all the steps. The reason for this is that when an operator who attaches the sensor to the bracket notices that the adhesive was forgotten to be applied, it is necessary to remove the glass plate module from the vehicle, resulting in a significant influence on the manufacture of the vehicle.

Figure 14:
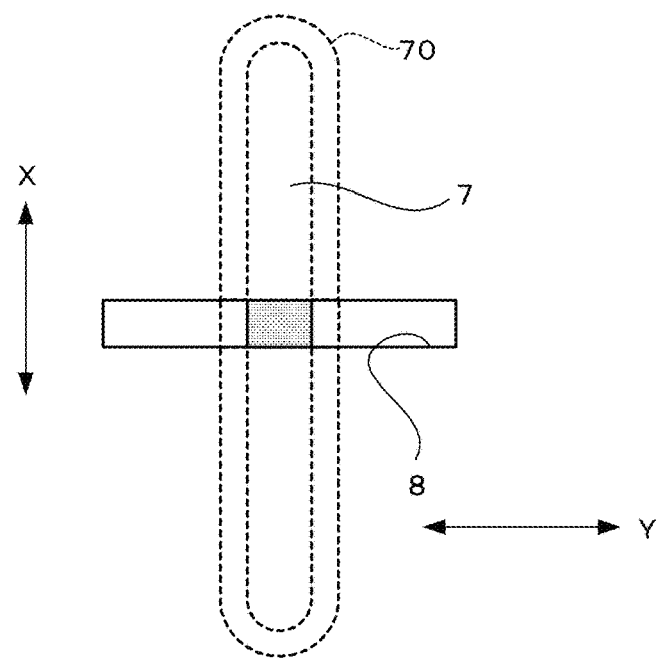
FIG. 14 is a plan view showing another example of the through hole.

Although there is no particular limitation on the shape of the through holes as mentioned above, it may be difficult to visually confirm whether or not the adhesive is present due to the color of the adhesive when the through hole is entirely filled with the adhesive. In contrast, when a through hole 8 is formed in which the length in a first direction X that is an extending direction of an adhesive 7 is smaller than the length in a second direction Y that intersects the first direction X as shown in FIG. 14, for example, it becomes easy to check the adhesive 7. With this configuration, even when the adhesive 7 is compressed, the through hole 8 is not entirely filled with the adhesive 7 in the second direction Y. Therefore, a portion in which the adhesive 7 is present and a portion in which the adhesive 7 is not present are generated inside the through hole 8, and these portions look different from each other. Therefore, when the adhesive 7 is present, two portions can be seen, thus making it easy to visually confirm the presence of the adhesive 7. It should be noted that the extending direction of the through hole need not completely correspond to the second direction and may be inclined.

6. MODIFIED EXAMPLES

Although the embodiment of the present invention has been described above, the present invention is not limited to the above embodiment, and various modifications can be carried out without departing from the gist of the invention. It should be noted that modified examples below can be implemented in combination as appropriate.

6-1

Figure 15:
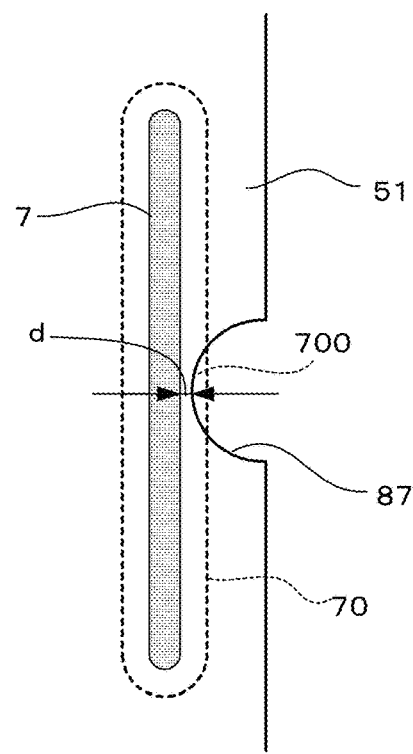
FIG. 15 is a plan view illustrating a cutout.

Although an example of an aspect for confirming whether or not adhesive is present is described in the above-described embodiment, other aspects are also possible. For example, as shown in FIG. 15, a cutout 87 is formed at the edge of the fixation portion 51 of the bracket 5, and the adhesive 7 is applied so as to pass near the cutout 87. With this configuration, when the bracket 5 is fixed to the mask layer 2, and the adhesive 7 is thus spread out, the adhesive 7 protrudes into the cutout 87, thus making it possible to visually confirm whether or not the adhesive 7 is present from the vehicle interior side. Specifically, a portion 700 in which the spread-out region 70 of the adhesive 7 and the cutout 87 overlap each other can be seen. Although there is no particular limitation on a distance d between the adhesive 7 and the cutout 87, the distance d is preferably about 0 to 3 mm in consideration of the width of the adhesive 7 spread out.

Figure 16:
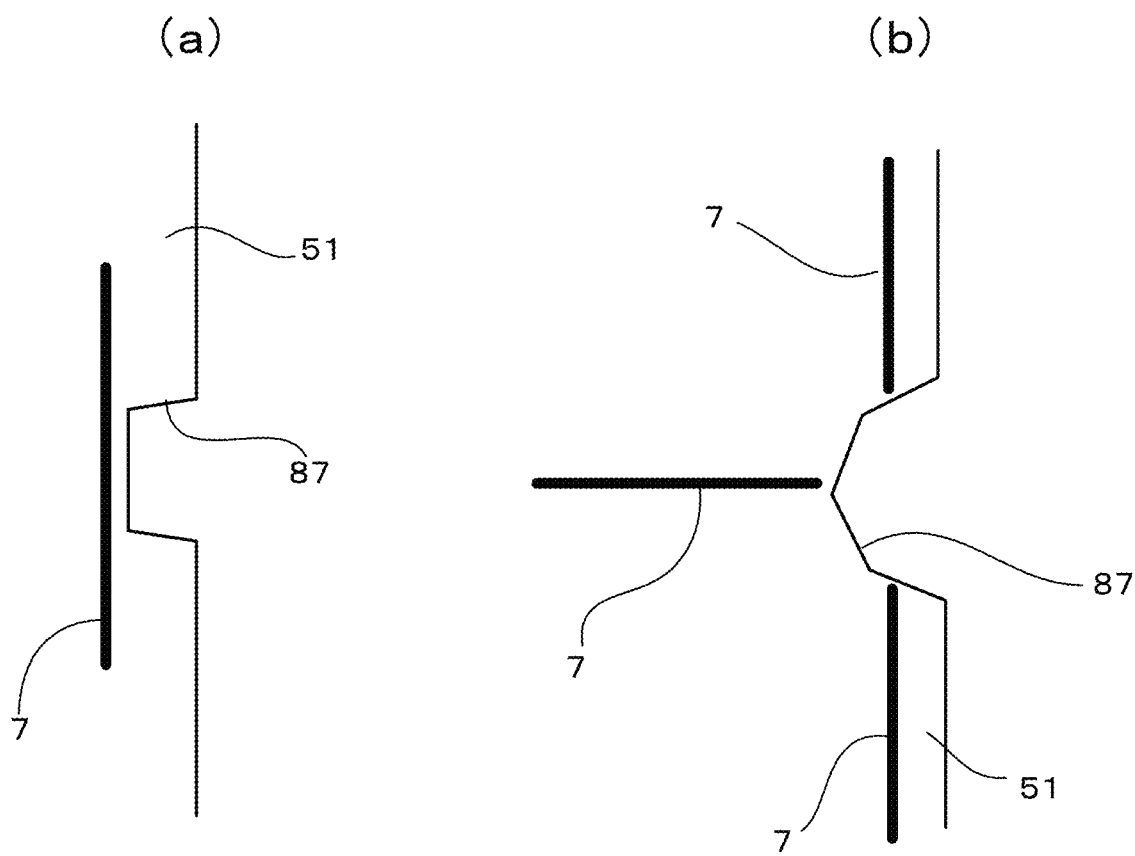
FIGS. 16($a$) and 16($b$) are plan views showing other examples of the cutout shown in FIG. 15.

The cutout 87 can be formed in various shapes such as a rectangular shape, an arc shape, and a polygonal shape as shown in FIG. 16. There are also no particular limitations on the number of portions to which the adhesive 7 is applied, the position of the adhesive 7 applied, and the shape of the adhesive 7 applied as long as a portion of the adhesive 7 protrudes into the cutout. It is preferable that the adhesive 7 is applied so as to pass the position farthest from the edge of the fixation portion 51 as shown in FIG. 15 as long as the adhesive 7 protrudes into the cutout 87. With this configuration, the adhesive 7 can be prevented from protruding outward from the edge of the fixation portion 51 when spread out, and thus enters only the cutout 87.

6-2

Figure 17:
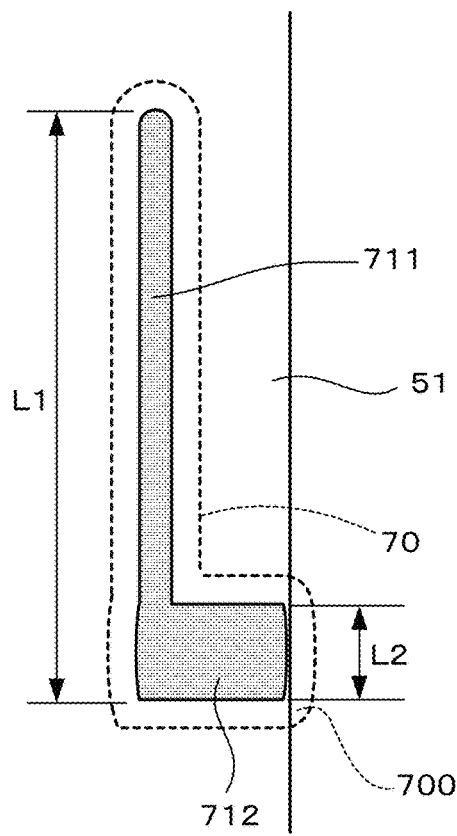
FIG. 17 is a diagram showing another way of applying the adhesive.

It can also be confirmed whether or not the adhesive is present by changing the shape of the adhesive applied instead of changing the shape of the bracket 5. For example, as shown in FIG. 17, the adhesive 7 can be applied in an L shape including a main portion 711 extending along the edge of the fixation portion 51 and an extended portion 712 extending from the main portion 711 to the edge of the fixation portion 51. At this time, a length L1 in an extending direction of the main portion 711 is set to be larger than a length L2 in the same direction of the extended portion 712. With this configuration, when the bracket 5 is fixed to the mask layer 22, and the adhesive 7 is thus spread out, the extended portion 712 of the adhesive 7 protrudes from the edge of the fixation portion 51, thus making it possible to visually confirm whether or not the adhesive 7 is present from the vehicle interior side. Specifically, a portion (reference numeral: 700) of the spread-out region 70 based on the extended portion 712 protrudes from the edge of the fixation portion 51 and thus can be seen. At this time, a portion at the edge of the fixation portion 51 in which the protrusion of the adhesive in the spread-out region 70 can be seen serves as an adhesive confirmation portion of the present invention. It is sufficient that the adhesive 7 has a minimum shape that enables the adhesive 7 to protrude because the main portion 711 of the adhesive 7 has a function of fixing the bracket 5 and the extended portion 712 thereof is used to confirm whether or not the adhesive is present. Therefore, it is preferable that the length L2 in the extended portion is as small as possible. It is sufficient that the extended portion 712 reaches the vicinity of the edge of the fixation portion 51, and the extended portion 712 need not be in contact with the edge as long as the spread-out region 70 protrudes from the edge.

Figure 18:
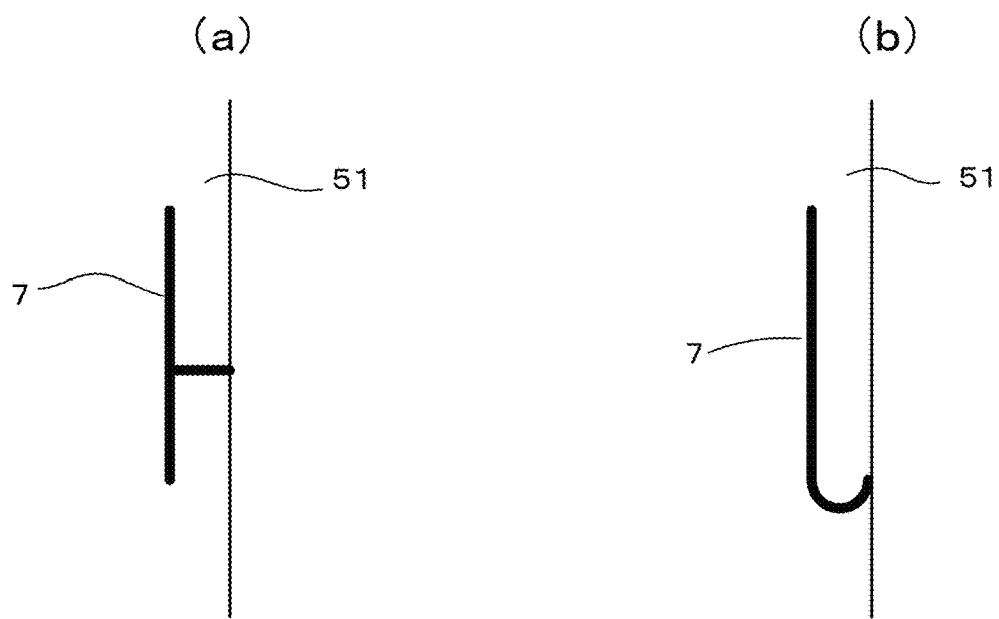
FIGS. 18($a$) and 18($b$) are diagrams showing other ways of applying the adhesive.

The adhesive can be applied in various shapes. For example, as shown in FIG. 18, the adhesive is not necessarily applied in an L shape, and may be formed in a J shape or a T shape.

6-3

The shape of the adhesive applied to the bonding surface may be a linear shape as mentioned above or various shapes such as a wave line, a broken line, a belt shape, a rectangular shape, a circular shape, and a polygonal shape. Moreover, there is no particular limitation on the number of portions to which the adhesive is applied. The same applies to the double-sided adhesive tape, and there are no limitations on the number and shape thereof.

6-4

In the above-mentioned embodiment, the sensor for measuring the distance between vehicles is used as the information acquisition device of the present invention, but there is no limitation to this, and various information acquisition devices can be used. That is, there is no limitation as long as the information acquisition device emits and/or receives light in order to acquire information from the outside of the vehicle. Various devices can be used, such as a visible light/infrared camera for measuring the distance between vehicles, a light receiving device for receiving signals from the outside of the vehicle that are emitted by an optical beacon or the like, and a camera using visible light and/or infrared rays that reads white lines on the road or the like as images. It is also possible to provide a plurality of openings in the center mask layer 22 depending on the type of light. It should be noted that the information acquisition device may be in contact with or may not be in contact with the glass plate.

The shape of the bracket 5 is not limited to the above-described shape, and various aspects are possible. For example, when a camera is used as the information acquisition device, only one opening may be formed, and when a plurality of information acquisition devices are used, two or more openings may be formed. Specifically, there is no particular limitation on the shape of the bracket 5 as long as the bracket 5 supports the information acquisition device, is provided with at least one opening having a closed circumference or at least one opening in which a portion of the circumference is open, has a fixation portion provided with a bonding surface facing the mask layer, and allows double-sided tape and adhesive to be applied thereto.

6-5

The mask layer 2 has a three-layer configuration as mentioned above, but is not limited thereto. Specifically, although the silver layer 242 is provided in the above-mentioned embodiment in order to block electromagnetic waves, a method of providing a single layer in which silver and a ceramic layer are mixed may be used, and another material such as copper or nickel may be layered as long as electromagnetic waves can be blocked. Although the silver layer 242 is sandwiched between the ceramic layers so as not to be seen from the outside, a member such as the above-described cover can be used instead of covering the silver layer 242 with the ceramic layers. An electromagnetic wave blocking layer is not necessarily provided, and it is sufficient that at least a layer for concealment from the outside is formed. Furthermore, the silver layer can also be applied in order to conceal the above-described region in which distortion occurs.

The mask layer 2 may have a color other than black, and there is no particular limitation as long as the mask layer 2 has a dark color such as brown, gray, and dark blue such that a field of vision from the outside of the vehicle is blocked and the vehicle interior side is concealed. A blocking film can be bonded instead of ceramic. A dark-colored resin film can be used as such a film, for example. Specifically, the blocking film can be made of polyvinyl chloride, polyurethane, polyethylene, polyethylene terephthalate, or the like, and is bonded to the glass plate 1 using adhesive. There is no particular limitation on the adhesive, and acrylic adhesive or the like can be used. ABF Film, FTW9953J Film, Black Film, or the like, manufactured by Sumitomo 3M Ltd. can be used as such a blocking film, for example. It should be noted that the blocking film may be used in combination with a ceramic layer to form the mask layer 2.

In the above-mentioned embodiment, an example is described in which when the mask layer 2 is formed on the inner side of the glass plate (inner surface of the inner glass plate 12), the bracket 41 is fixed to the mask layer 2. However, when the mask layer 2 is formed on the inner surface of the outer glass plate 11 or the outer surface of the inner glass plate 12 in the laminated glass, for example, the bracket 41 is fixed at a position corresponding to the position at which the mask layer 2 is formed on the inner surface of the inner glass plate 12.

6-6

Although the double-sided adhesive tape is used as the second adhesion means of the present invention in the above-mentioned embodiment, there is no limitation thereto. Specifically, if adhesive is configured to conduct preliminary fixing prior to curing, the adhesive can be used as the second adhesion means. For example, rubber pieces with two surfaces to which quick-drying adhesive has been applied can be used. This makes it possible to ensure a clearance between the bonding surface and the mask layer.

REFERENCE SIGNS LIST

1 Glass plate
2 Mask layer
22 Center mask layer
5 Bracket (attachment member)
61 to 64 Double-sided adhesive tape (second adhesion means)
71 to 75 Adhesive (first adhesion means)

The invention claimed is:

1. A glass plate module to be attached to a vehicle, the glass plate module comprising:
    laminated glass in which an outer glass plate, an interlayer, and an inner glass plate are layered in this order;
    a mask layer that is provided on the laminated glass and blocks a field of vision from outside; and
    an attachment member that is attached to a portion corresponding to the mask layer on the inner glass plate with at least a first adhesion means and a second adhesion means and configured to support an information acquisition device for acquiring information from outside of the vehicle,
    wherein the first adhesion means includes adhesive at at least one location,
    the second adhesion means is configured such that the adhesive conducts preliminary fixing prior to curing,
    the attachment member includes a fixation portion that has a bonding surface facing the mask layer and provided with both of the adhesion means,
    the fixation portion includes at least one adhesive confirmation portion through which the adhesive applied to the bonding surface can be seen from the vehicle interior side,
    the adhesive confirmation portion is constituted by a cutout formed at an edge of the fixation portion,
    the adhesive confirmation portion is disposed over both a portion in which the adhesive is present and a portion in which the adhesive is not present,
    the second adhesion means includes at least one piece of double-sided adhesive tape having a thickness of 0.2 mm or more and 0.8 mm or less, and
    at least a portion of a region to which the adhesive is applied or a spread-out region of the adhesive overlaps with the cutout on the bonding surface.

2. The glass plate module according to claim 1,
    wherein the adhesive confirmation portion is constituted by a through hole formed in the fixation portion, and
    at least a portion of a region to which the adhesive is applied and a spread-out region of the adhesive intersects the through hole on the bonding surface.

3. The glass plate module according to claim 2,
    wherein the adhesive is applied in a linear manner to intersect the through hole, and
    the through hole is formed to have an external shape in which a length in a first direction in which the adhesive extends is smaller than a length in a second direction that intersects the first direction at a right angle.

4. The glass plate module according to claim 1, wherein the adhesive is applied in a linear manner so as to pass near a position that is farthest from an outer edge of the fixation portion.

5. The glass plate module according to claim 4, wherein the cutout is formed in an arc shape.

6. The glass plate module according to claim 1,
    wherein when applied to the bonding surface, the adhesive is constituted by a main portion and an extended portion that extends from the main portion to an edge of the fixation portion or a vicinity of an edge of the fixation portion, and
    the adhesive confirmation portion is constituted by a portion at an edge of the fixation portion, which is reached by the extended portion.

7. The glass plate module according to claim 6,
    wherein the main portion is formed to extend in one direction, and
    a length in the extended portion in a direction in which the main portion extends is smaller than a length of the main portion.

8. The glass plate module according to claim 1, wherein the mask layer is made of a dark-colored ceramic layer.

9. A method for manufacturing a window module provided with an information acquisition device for acquiring information from outside of a vehicle, the window module being configured to be attached to the vehicle, the method comprising:
    a step of preparing a glass plate module including:
        laminated glass in which an outer glass plate, an interlayer, and an inner glass plate are layered in this order;
        a mask layer that is provided on the laminated glass and blocks a field of vision from outside; and
        an attachment member that is attached to a portion corresponding to the mask layer on the inner glass plate with at least a first adhesion means and a second adhesion means and supports the information acquisition device, and a step of installing the information acquisition device on the inner glass plate side via the attachment member, wherein the first adhesion means includes adhesive at at least one location, the second adhesion means is configured such that the adhesive conducts preliminary fixing prior to curing, the attachment member includes a fixation portion that has a bonding surface facing the mask layer and provided with both of the adhesion means, the fixation portion includes at least one adhesive confirmation portion through which the adhesive applied to the bonding surface can be seen from the vehicle interior side, the adhesive confirmation portion is constituted by a cutout formed at an edge of the fixation portion, the adhesive confirmation portion is disposed over both a portion in which the adhesive is present and a portion in which the adhesive is not present, the second adhesion means includes at least one piece of double-sided adhesive tape having a thickness of 0.2 mm or more and 0.8 mm or less, and at least a portion of a region to which the adhesive is applied or a spread-out region of the adhesive overlaps with the cutout on the bonding surface.

10. A method for manufacturing a vehicle provided with an information acquisition device for acquiring information from outside of the vehicle, the method comprising:

a first step of fixing a glass plate module to a front portion of the vehicle, the glass plate module including:

laminated glass in which an outer glass plate, an interlayer, and an inner glass plate are layered in this order;

a mask layer that is provided on the laminated glass and blocks a field of vision from outside; and an attachment member that is attached to a portion corresponding to the mask layer on the inner glass plate with at least a first adhesion means and a second adhesion means and supports the information acquisition device, and a second step of installing the information acquisition device on the glass plate module after the first step, wherein the first adhesion means includes adhesive at at least one location, the second adhesion means is configured such that the adhesive conducts preliminary fixing prior to curing, the attachment member includes a fixation portion that has a bonding surface facing the mask layer and provided with both of the adhesion means, the fixation portion includes at least one adhesive confirmation portion through which the adhesive applied to the bonding surface can be seen from the vehicle interior side, the adhesive confirmation portion is constituted by a cutout formed at an edge of the fixation portion, the adhesive confirmation portion is disposed over both a portion in which the adhesive is present and a portion in which the adhesive is not present, the second adhesion means includes at least one piece of double-sided adhesive tape having a thickness of 0.2 mm or more and 0.8 mm or less, and at least a portion of a region to which the adhesive is applied or a spread-out region of the adhesive overlaps with the cutout on the bonding surface.

\* \* \* \* \*